United States Patent [19]
Williams

[11] Patent Number: 5,718,301
[45] Date of Patent: Feb. 17, 1998

[54] GOLF CART WITH GOLF CLUB CARRYING RACK

[75] Inventor: Hansford R. Williams, Sarasota, Fla.

[73] Assignee: Paragon Classics, Inc., Sarasota, Fla.

[21] Appl. No.: 516,798

[22] Filed: Aug. 18, 1995

[51] Int. Cl.$^6$ ............................................. B60K 1/00
[52] U.S. Cl. ..................... 180/65.1; 180/908; 280/783; 280/769; 280/DIG. 5
[58] Field of Search .......................... 280/847, 848, 280/153.5, 154, 169, 783, 47.11, DIG. 5, DIG. 6; 180/65.1, 65.6, 908; 296/3; 410/3, 4, 6, 8; 301/1, 9.2

[56] References Cited

U.S. PATENT DOCUMENTS

| | | | |
|---|---|---|---|
| 2,059,305 | 11/1936 | Best | 280/848 |
| 2,958,386 | 11/1960 | Brunderman | 180/65.1 |
| 2,970,008 | 1/1961 | Leach | 301/1 |
| 3,042,443 | 7/1962 | Laher | 296/3 |
| 3,117,648 | 1/1964 | Landreth | 180/65.6 |
| 3,704,916 | 12/1972 | Dietrich | 301/1 |
| 3,709,553 | 1/1973 | Churchill et al. | 280/DIG. 5 |
| 3,879,059 | 4/1975 | Gibes | 280/848 |
| 4,795,205 | 1/1989 | Gerber | 280/DIG. 5 |
| 4,966,510 | 10/1990 | Johnson, Jr. | 410/3 |
| 5,069,481 | 12/1991 | Strange | 280/769 |
| 5,213,364 | 5/1993 | Theckston | 280/769 |
| 5,385,380 | 1/1995 | Heavner | 280/DIG. 5 |

Primary Examiner—Brian L. Johnson
Assistant Examiner—Frank Vanaman
Attorney, Agent, or Firm—Lon H. Romanski

[57] ABSTRACT

A self-propelled golf cart has a cart body which effectively defines a chamber in the rearward portion of the body; the chamber has first and second side walls generally opposed to each other; each of the side walls has a plurality of apertures formed therethrough which respectively communicate with tubular members which are within the chamber and generally between the side walls; and golf clubs are respectively inserted into and through the apertures as to result in the shafts of such clubs extending into respective ones of the tubular members.

27 Claims, 7 Drawing Sheets

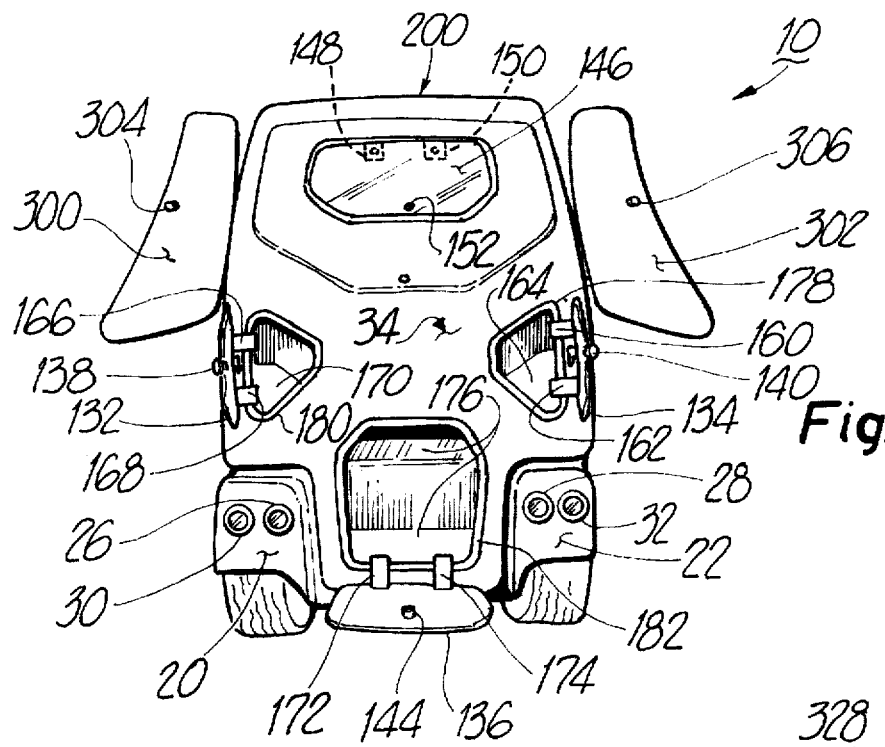
Fig. 4
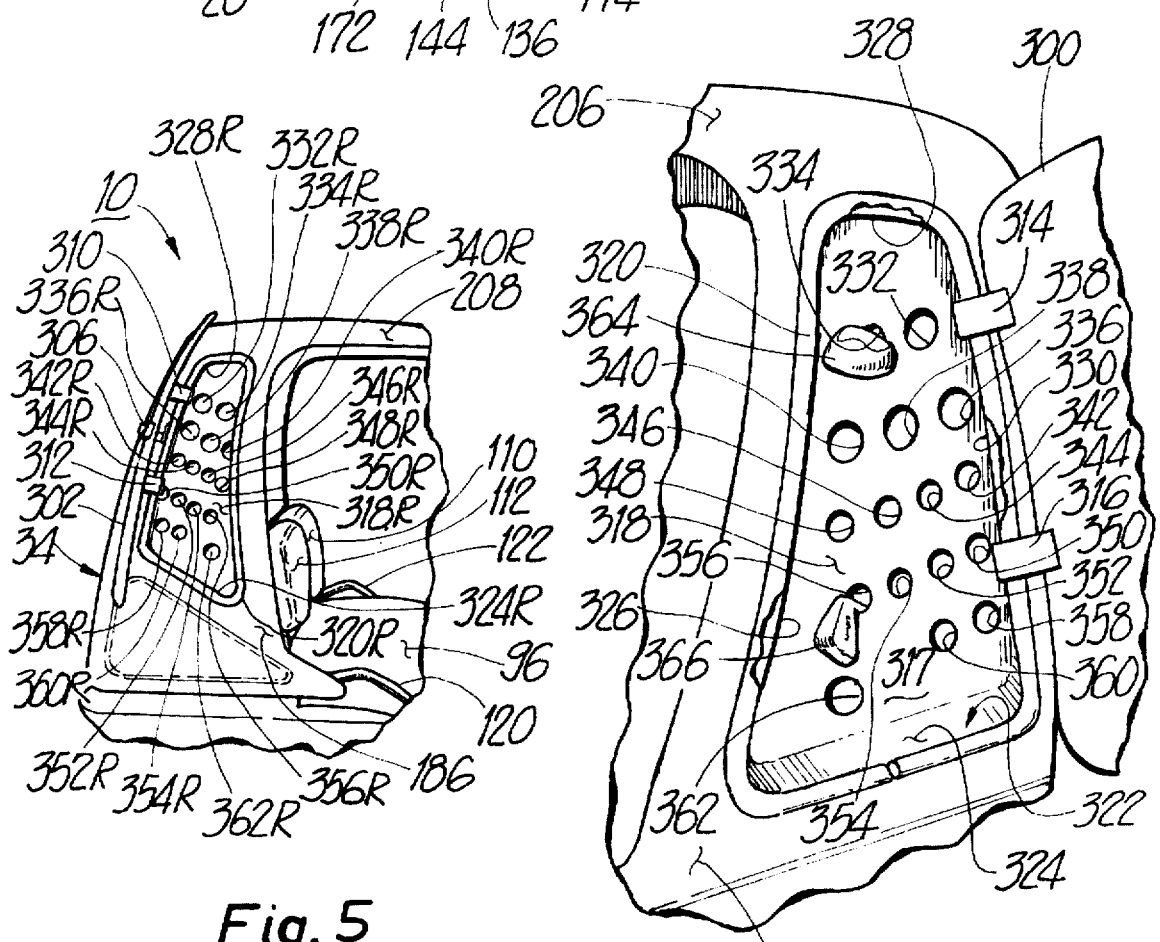
Fig. 5
Fig. 6

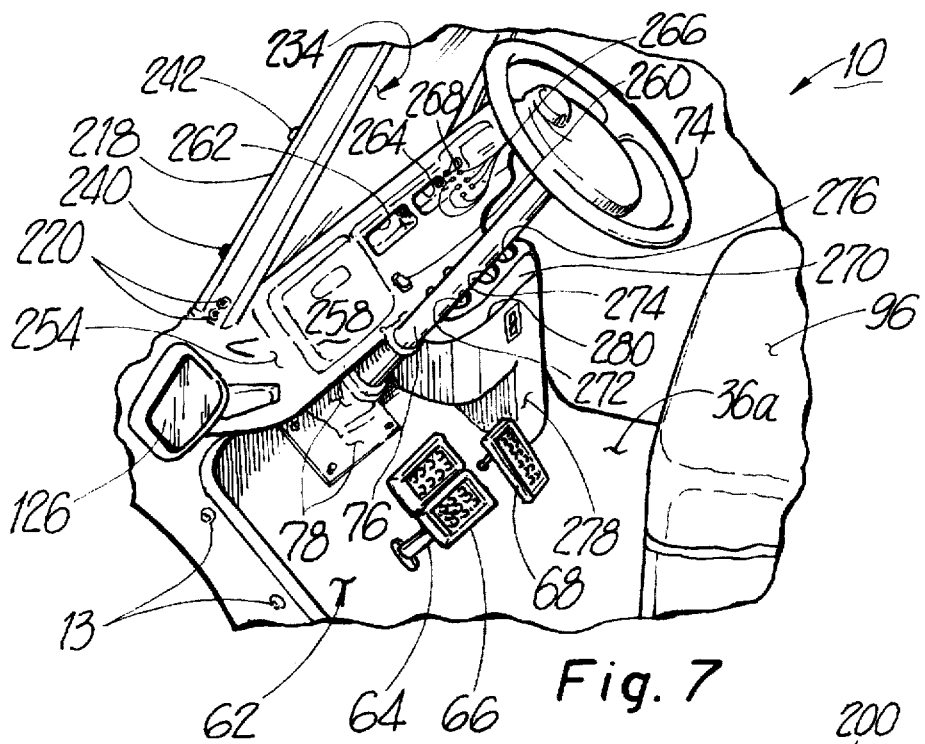
Fig. 7
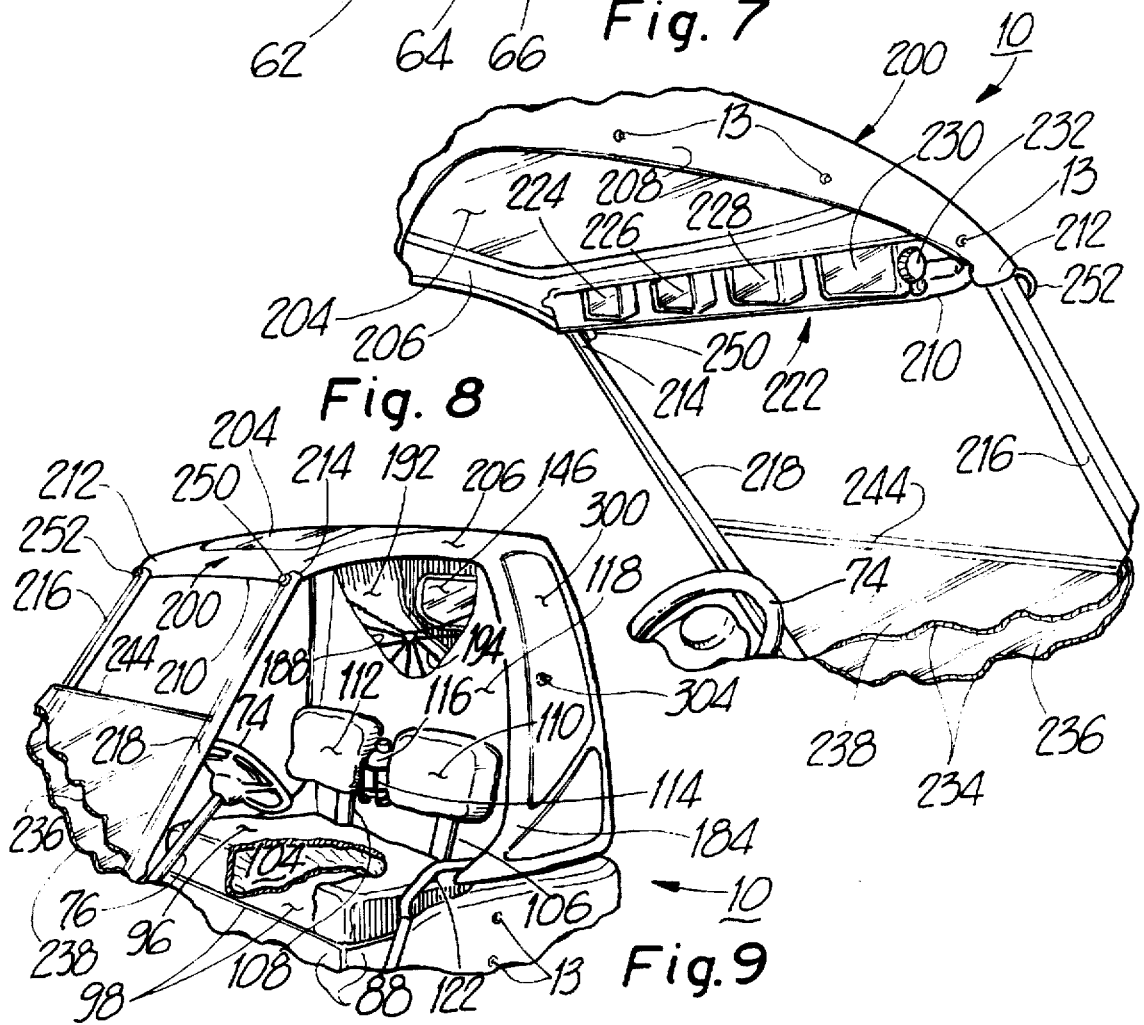
Fig. 8
Fig. 9

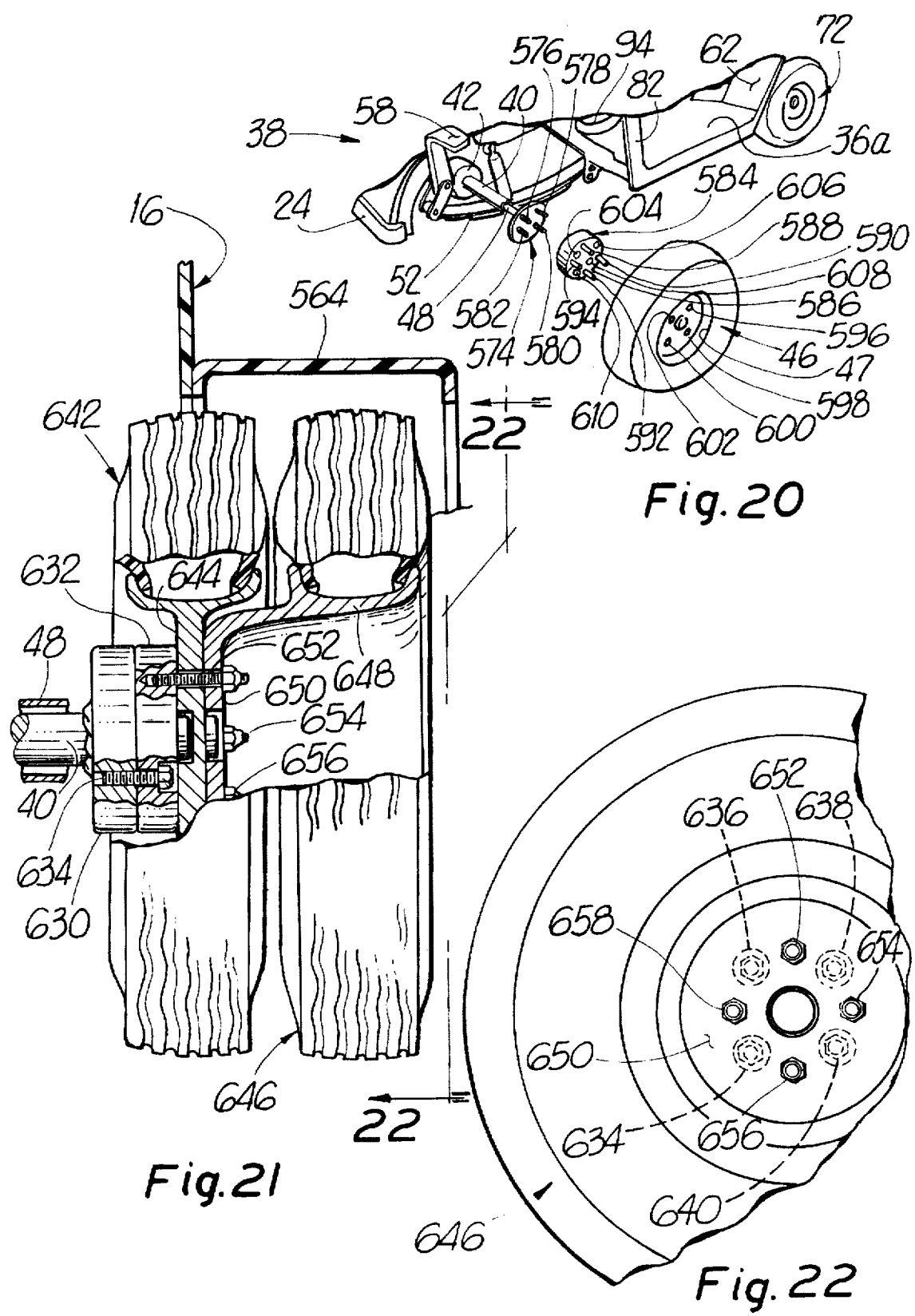

GOLF CART WITH GOLF CLUB CARRYING RACK

FIELD OF THE INVENTION

This invention relates generally to the sport of golfing and more particularly to motorized golf carts often employed by golfers in traversing a golf course and still more particularly to an improved golf cart which among other benefits and improvements provides an improved rack for carrying golf clubs on the golf cart.

BACKGROUND OF THE INVENTION

Heretofore the prior art has proposed and provided various devices and/or arrangements for carrying golf clubs on the motorized golf cart. Some prior art devices comprised open frame-like cages, secured as upon the rear of the golf cart, for the placement into such cages of conventional golf club bags, for carrying golf clubs and resting such bags somewhat at inclined angles.

The prior art has also proposed the use of a generally vertical rack at the rear portion of the golf cart for carrying a set of golf clubs. Generally, the prior art comprised a rack which has a horizontal upper panel having selectively spaced holes with vertical plastic tubes for positioning the clubs in a selective order.

The prior art has also proposed the use of a horizontally positioned rotatable drum carried as near the rear of the vehicle (golf cart) which carries golf clubs generally near the periphery of the drum so that as the drum is suitably rotated the desired club is brought into registry with an access hatch through which the golfer may extract the desired club.

Accordingly, the invention as herein disclosed is primarily directed to proposing an improved golf cart and directed to overcoming and/or eliminating related and attendant problems of the prior art.

SUMMARY OF THE INVENTION

According to the invention a self-propelled golf cart comprises a cart body, steering gear means for steering the cart in a desired direction, seats for accommodating at least two players of golf, a general chamber between opposed side wall means of said cart, a first plurality of apertures formed in a first of said opposed side wall means, a second plurality of apertures formed in a second of said opposed side walls, a generally lower disposed base-like surface within said chamber, a plurality of tube-like members, and wherein said plurality of tube-like members are respectively operatively connected to respective ones of said plurality of apertures, each of said tube-like members being inclined downwardly from said apertures and at least toward said base-like surface.

Various general and specific objects, advantages and aspects of the invention will become apparent when reference is made to the following detailed description considered in conjunction with the accompanying drawings.

BRIEF DESCRIPTION OF THE DRAWINGS

In the drawings wherein for purposes of clarity certain details and/or elements may be omitted from one or more views:

FIG. 4 is a view similar to that of FIG. 3 and further illustrating some of the doors of the golf cart in an opened condition;

FIG. 5 is a fragmentary elevational view, as of a portion of FIG. 1, illustrating one of the doors (starboard or right side) open for access to golf clubs;

FIG. 6 is a view similar to that of FIG. 5 but of comparatively enlarged scale illustrating the (port or left side) door open for access to golf clubs;

FIG. 7 is an elevational view of a fragmentary portion of the interior of the golf cart of FIG. 1;

FIG. 8 is a perspective view of a somewhat enlarged scale illustrating a portion of the interior of the golf cart;

FIG. 9 is a perspective view of a fragmentary portion of the golf cart showing, among other things, rider accommodations;

FIG. 20 is a fragmentary view of that shown in FIG. 11 and illustrating another contemplated modification;

FIG. 21 is a view of a pair of tires with portions thereof removed to better show the assembly thereof; and FIG. 22 is a fragmentary elevational view taken generally on the plane of line 22—22 and looking in the direction of the arrows.

DESCRIPTION OF THE PREFERRED EMBODIMENT

Figure 1:
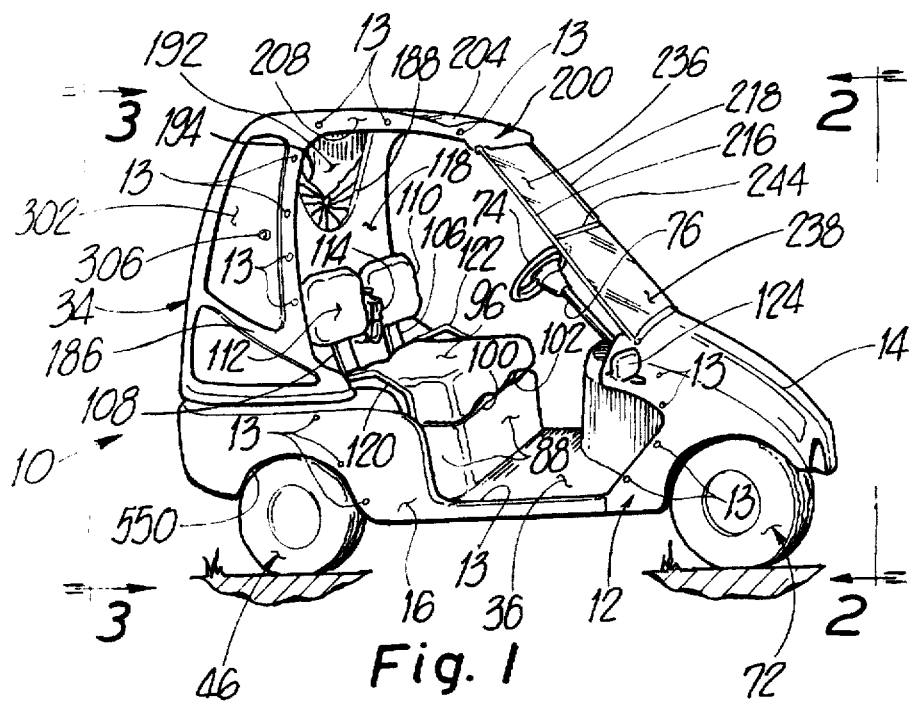
FIG. 1 is a side elevational view of a golf cart employing teachings of the invention.
Figure 10:
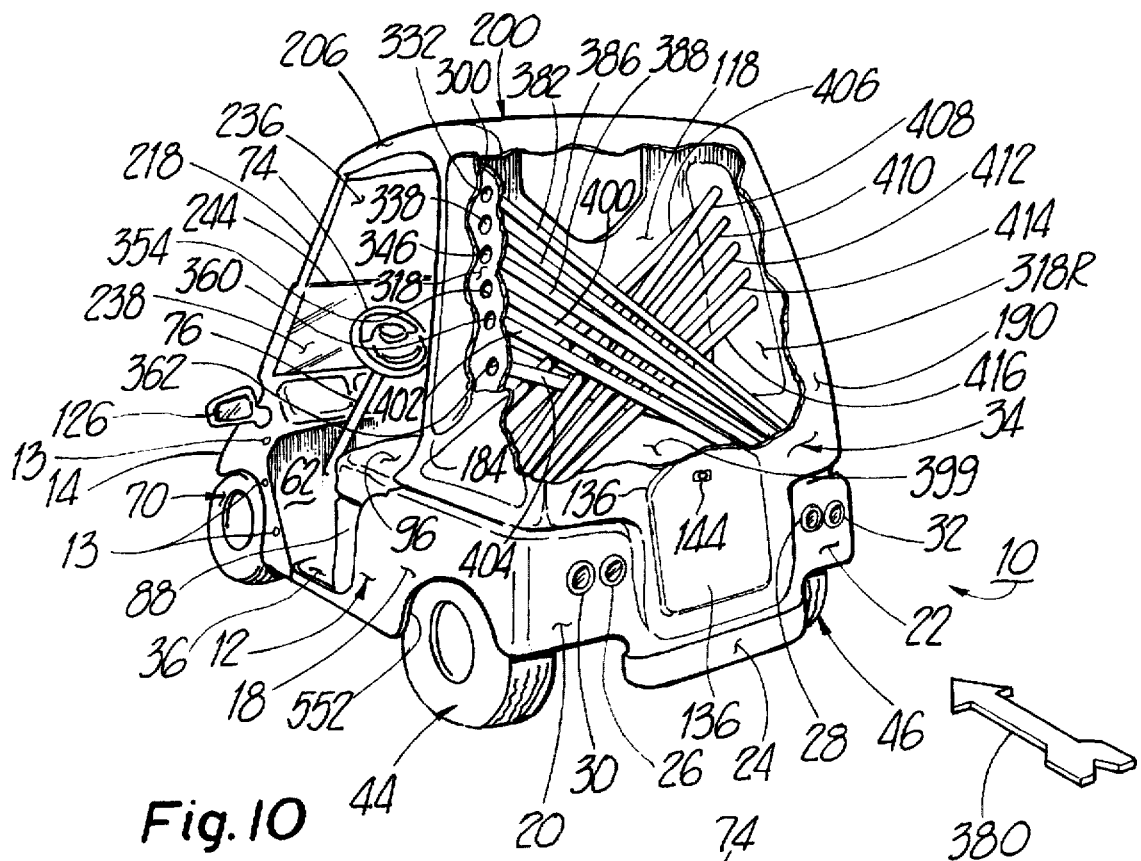
FIG. 10 is a perspective view of the golf cart with a fragmentary portion thereof broken away and removed to better illustrate some of the elements contained therein.

Referring now in greater detail to the drawings, FIG. 1 illustrates a golf cart 10, employing teachings of the invention, comprising a golf cart or vehicular body 12 which, generally, may be referred to as having a front end or front portion 14, a right lower side body portion 16, a left lower side body portion 18, rear lower side body portions 20 and 22 which may be generally laterally joined as by a transverse bumper-like portion 24. In the preferred embodiment, the rear of the cart 10 is provided as with combination tail light stop light assemblies 26 and 28 and may also be provided with backing-up lights 30 and 32 or even additional tail light assemblies, if desired. As generally depicted in FIGS. 1 and 10, the lower side body portions 16 and 18 meet and may be joined to the frontal portion 14, of the lower body 12, with such joining being accomplished as by, for example, screws and/or rivets 13. However, any suitable means may be employed for accomplishing the joining of various body portions.

In the preferred embodiment, both the lower body portion 12 and the upper body portion 34 are comprised of suitable fiberglass. The floor 36 of cart 10 may in fact be the same metal floor 36a of the chassis 38 of FIG. 11. Of course, the metal floor 36a may be provided with a suitable overlay.

Figure 11:
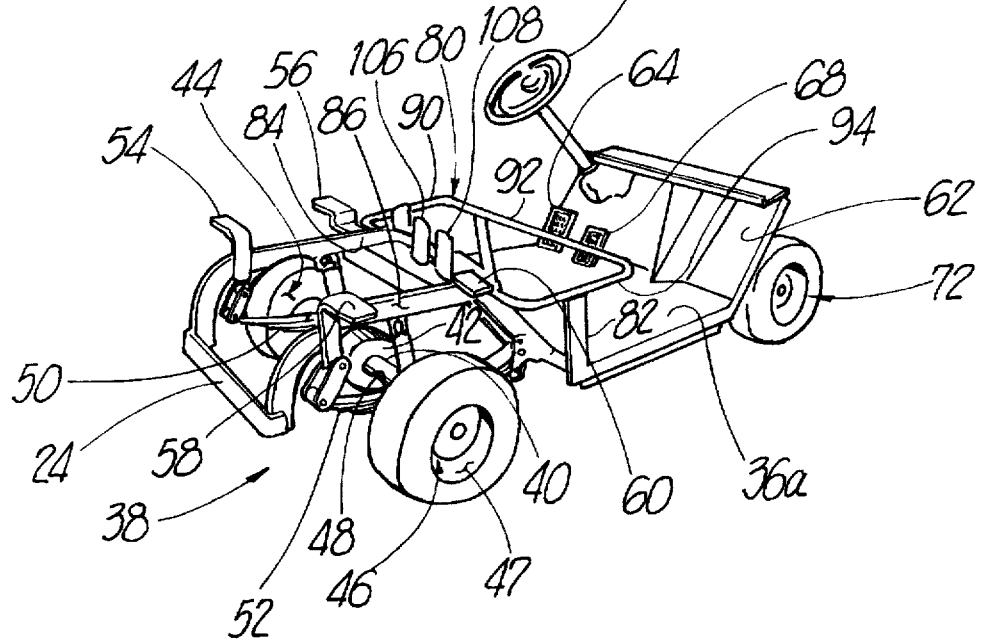
FIG. 11 is a perspective view of a chassis employable in the construction of the subject golf cart.

Still referring primarily to FIG. 11, the rear axle assembly 40 is operatively connected as to the prime mover, an electric motor 42, and the rear drive wheel assemblies 44 and 46. The axle shaft housings 48 are suitably secured to semi-eleptical spring assemblies 50 and 52, respectively. Suitable support brackets 54 and 56 are effective to operatively engage and support the left rear portion 18 as well as structure supported thereby while brackets 58 and 60 are effective to operatively engage and support the right rear portion 16 as well as structure supported thereby. A forward situated inclined floor or wall portion 62, among other things operatively supports the vehicular brake pedal 66 and movable brake pedal rod 64 along with the vehicular engine speed controller pedal 68.

The inclined wall or floor portion 62 also suitably carries the front suspension and steering linkage arrangement (not shown) which may be, for example, of any suitable type many of which are known in the art. Such front suspension and steering arrangement may be considered as comprising left and right ground-engaging front steerable wheel assemblies 70 and 72 which are operatively connected to the vehicular steering wheel 74 and steering column assembly 76 operatively supported as at 78 by the inclined wall or floor 62 as to operatively pass therethrough to the front suspension and steering system.

Referring primarily to FIGS. 11, 9 and 1, a rectangular-like boundary structure 80 is suitably supported by vertically extending braces or supports, one of which is depicted at 82, and may also rest against and be secured to portions of vehicular frames 84 and 86. A fiberglass wall 88 is suitably formed as to wrap around most of the forward portion of the rectangular frame 80 and to extend downwardly preferably to the floor 36 and further, preferably, to at least to some degree curl onto and overlay portions 90, 92 and 94 of the rectangular frame 80.

The volume within the rectangular frame 80 as generally enclosed by the wall 88 provides the space necessary for the vehicular drive and power batteries as well as the various cables and controls.

In the preferred embodiment, a single elongated cushion 96 preferably having an underside of relative stiff supporting material 98 is situated atop the frame 80 and wall 88 and may be pivotally operatively secured to the frame 80 and/or wall 88 as by suitable hinging means generally depicted at 100 and 102 of FIG. 1. The cushion 96 may have an outer cover along with inner resilient material 104 (FIG. 9).

Referring to FIG. 11, a pair of generally vertically extending members 106 and 108 are suitably fixedly secured to the adjacent portions of the chassis 38. These members 106 and 108 are adapted to, in turn, carry passenger (rider) back support cushions 110 and 112, respectively, as generally depicted in FIGS. 1, 2, 5 and 9. A receptacle 114, suitably secured to the vertically extending wall 118, serves to carry a removable sand bottle 116. As depicted in FIGS. 1, 5 and 9 suitable rider hand-holds 120 and 122 are operatively secured to the overall housing generally as at opposite ends of the cushion 96.

Figure 2:
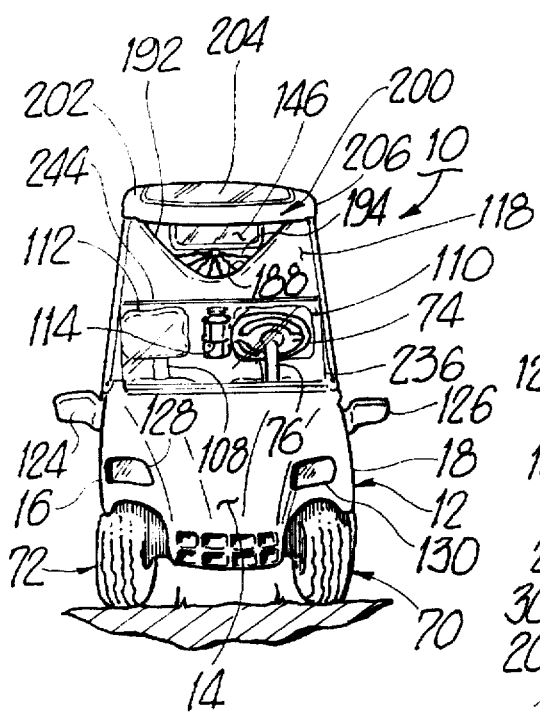
FIG. 2 is an elevational view, in somewhat relatively reduced scale, taken generally on the plane of line 2—2 of FIG. 1 and looking in the direction of the arrows.
Figure 3:
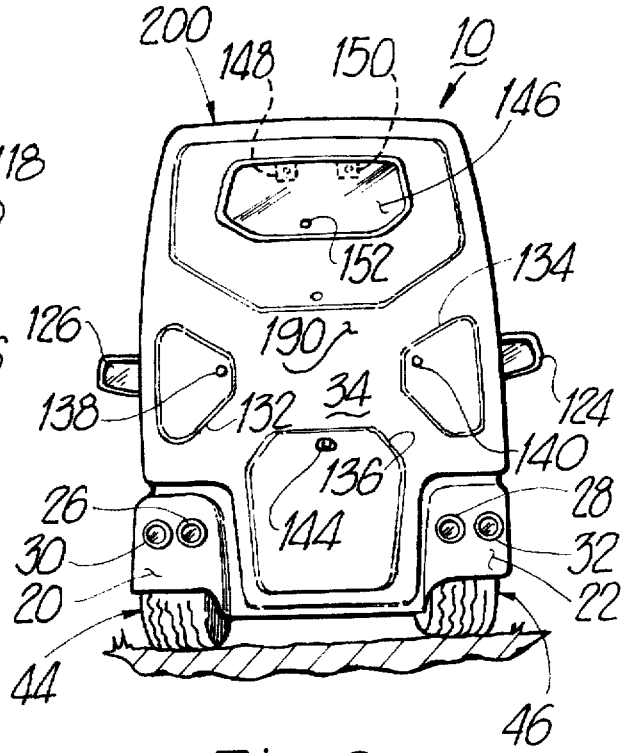
FIG. 3 is an elevational view, in somewhat slightly reduced scale, taken on the plane of line 3—3 of FIG. 1 and looking in the direction of the arrows.

As shown in FIGS. 1, 2 and 3 a right outside rear view mirror 124 is carried by the forward portion 14 of the cart 10. Similarly, as shown in FIGS. 2, 3, 7 and 10, a left outside rear view mirror 126 is carried by the forward portion 14 of the cart.

In addition to the tail lamps 26, 28, 30 and 32 the cart 10 is also preferably provided with electric head lamps 128 and 130 (FIG. 2).

Referring in particular to FIG. 3 the rear of the cart 10 is provided with a plurality of pivotally openable doors 132, 134 and 136 which, in turn, preferably are respectively provided with knob-like structures 138, 140 and 144 which are preferably key operated as to enable the locked closure of doors 132, 134 and 136. Further, preferably, a rear mounted window 146 is operatively connected to suitable hinge means 148 and 150 and similarly is provided with a knob-like structure 152 which is preferably key operated as to enable the locked closure of window 146. However, the practice of the invention is not so limited. That is, for example, the rear mounted window 146 may be fixedly secured, against movement, to or about its cooperating opening in the rear wall 190. Also, even though such would not be preferred, the practice of the invention does not have to have any rear window in rear wall 190.

Referring now also to FIG. 4, it can be seen that in the preferred embodiment suitable hinges 160 and 162 suitably pivotally connect the door 134 to the cart 10. When the door 134 is opened, access to a storage or stowage chamber 164 is made available. Similarly, the opposite door 132 is provided with suitable hinges 166 and 168 which pivotally connect the door 132 to the cart 10. When the door 132 is opened, access to the stowage chamber 170 is made available.

Still referring to FIG. 4, suitable hinges 172 and 174 are effective for pivotally connecting the door 136 to the cart 10. When door 136 is opened, as depicted, it provides access to the stowage chamber 176 and, as depicted in FIG. 4, the opened door 136 may serve as a ledge or temporary support onto which, for example, articles of clothing can be placed as during changing thereof. In the preferred embodiment, suitable generally resilient strips, as at 178, 180 and 182 may be attached to the rear body portion 34 as to in effect cooperate, respectively, with doors 134, 132 and 136 to preclude the leakage or seepage of water and of the passage of dust from the exterior and into chambers 164, 170 and 176.

Referring primarily to FIGS. 1, 3 and 9, it can be seen that left and right side walls 184, 186 are effectively transversely spaced from each other as by a relatively forwardly situated generally vertically extending wall 118 and a spaced relatively rearwardly situated vertically extending but preferably somewhat curved rear wall portion 190. Such walls 184, 186, 118 and 190 generally define a chamber therebetween with such chamber being of sufficient space to receive at least two sets of golf clubs.

In the preferred embodiment, inner or forward wall 118 is formed with what may be considered a cut-out or relieved portion having a remaining configuration as generally depicted at 188.

A further curvilinear wall 192 is suitably secured to cut-out edge 188 thereby forming a pocket-like chamber or recess and enabling a view rearwardly through window 146. A suitable flexible restraining device 194 functions much as a fence thereby enabling the space between the rear wall 190 and restraining device 194 to be employed for carrying, especially temporarily, items of clothing and/or equipment.

In the embodiment disclosed, a roof portion 200 is preferably integrally formed with or joined to left 184 and right 186 side walls and rear wall 190. The roof 200 is preferably comprised of a main panel portion 202 which, as depicted in FIGS. 1, 2, 8 and 9, may be fitted with a suitable skylight 204 located generally medially.

In the preferred embodiment, the roof structure 200 has depending left 206 and right 208 roof portions which, among other things enhance the strength and rigidity of the overall roof structure 200.

As generally depicted in FIGS. 1, 2, 8, 9 and 10 the relatively forward end 210 of roof structure 200 is formed as to be generally downwardly depending and, as what may be considered corner-like portions 212 and 214 are respectively structurally engaged to support struts 216 and 218 which, in turn, are each fixedly secured to the forward portion of the cart overall body as typically illustrated at 220 of FIG. 7. As best seen in FIG. 8 the downwardly depending forward portion 210 is, at its interior, provided with an assembly 222 of generally rear view mirrors 224, 226, 228 and 230, which may also comprise manually actuatable means 232 for positioning the mirrors in an optimum position for use by the driver of the cart 10.

In the preferred embodiment, the cart 10 is provided with a windshield structure 234 which may be comprised of a plurality of windshield sections 236 and 238 which are operatively carried by the forward supports or struts 216 and 218. The lower windshield section 238 may be fixedly secured to struts 216, 218 as by suitable retainer means typically illustrated at 240 and 242 (FIG. 7). Windshield sections 236 and 238 are preferably hingedly secured to each other by suitable hinging means 244 thereby enabling the upper disposed windshield section 236 to be released from supports 216 and 218 and laid down over the lower disposed windshield section 238. FIGS. 2, 8 and 9 may be considered as depicting the windshield structure 234 as being functionally open and, if the rear window 146 is also opened, air flows through the opened windshield, the interior of the cart 10 and out of the opened rear window 146 if the cart 10 has the preferred openable rear window 146. No such air flow would occur if the rear window 146 was fixedly secured against opening or if no such rear window was formed in back wall 190. When the upper windshield section 236 is pivotally rotated upward as to be generally against supports or struts 216 and 218, such may be locked into operative position as by manually actuated retainers 250 and 252.

The cart 10 is provided, generally in its interior with what may be referred to as a dashboard portion 254. Referring in particular to FIG. 7 the dashboard 254 depicted therein is shown as preferably comprising a "glove-box" type receptacle 256 having a manually openable door or cover 258; an openable and closeable electrical switch, may be at 260, for among other things selectively completing the electrical power circuit from the batteries to the electric drive motor 42.

Generally adjacent and to the right of receptacle 258 are a pair of open recesses 262 and 264 into which reserve golf balls may be placed and generally stored. Further to the right, the dashboard or dashpanel 254 may be provided with a plurality of particularly sized holes 266 into which golf tees (one of which is shown at 268) may be inserted and frictionally held for subsequent use.

In the preferred embodiment, the dashpanel 254 may have a generally rearwardly extending flange-like portion 270 into which are formed a plurality of recesses 272, 274 and 276 large enough to hold containers of suitable drinking liquids. A separate lower housing or container 278 is operatively connected to the upper flange 270 and is manually movable some distance away from flange 270 as to have an open end as about 280. The container 278 may be employed for carrying ice and a supply of libation therein.

Another improvement over the prior art is the containment and carrying of golf clubs by the vehicle 10.

Figure 12:
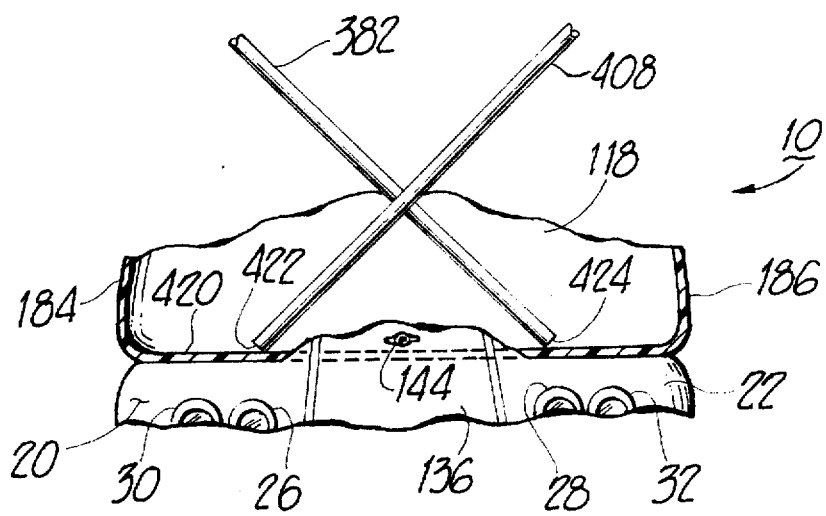
FIG. 12 is a fragmentary elevational view of the rear portion of the cart with certain portions and details eliminated and with the view taken generally in the direction of arrow 380 of FIG. 10.

FIGS. 1, 9, 4, 5 and 6 along with FIGS. 10 and 12 depict the manner and apparatus by which the cart 10 carries the two sets of golf clubs. Referring first to FIGS. 1 and 9, the upper portion of the golf cart 10 is shown as comprising a left generally upper door 300 and a right generally upper door 302. Door 300 may have a locking knob 304 which, upon actuation as by a cooperating key, serves to lock and hold the door 300 closed and locked in such position, as depicted, for example, in FIG. 9. Similarly, door 302 may have a locking knob 306 which, upon actuation as by a cooperating key, serves to lock and hold the door 302 closed and locked in such position, as depicted, for example, in FIG. 1.

FIG. 4, an elevational view from behind the cart 10, among other things depicts both side doors or golf club access doors 300 and 302 fully opened thereby permitting the stored golf clubs to be selectively removed and used in the playing of the game.

FIGS. 5 and 6 are of relatively differing scale; however, FIG. 5 is intended to depict what could be seen with the right side door 302 being made fully opened. Door 302 is swingably attached generally to the side of the cart 10 as by hinging means 310 and 312 which, preferably, are of the type that, upon the door 302 being opened to a desired wide open position, will without assistance from any person, keep the door 302 thusly open until such time as the player replaces the club into its corresponding holder and then manually moves the door 302 to its closed position as depicted in FIG. 1.

The same, functionally, applies to FIG. 6. There, the door 300 is fully opened in the same manner described with reference to FIG. 5 and the hinging means 314 and 316 are effective to continue holding door 300 open in the same manner as already described with reference to FIG. 5 and the door 302 and hinges 310 and 312 depicted therein.

It is contemplated that not all embodiments of the invention will be such as to have the doors 300 and 302 be spring-loaded open as by, for example, resilient detents or other elastomeric means. It is further comtemplated that some purchasers and/or users of the invention may desire to have the doors 300 and 302 simply hinged without any springs, detents or other elastomeric means, and that such doors 300 or 302 would be held open as by the person getting a golf club from that set (otherwise covered by the door) and upon "letting-go" of the door, the door would close by gravity but not necessarily become latched. The latching action of such a door would be usually provided by suitable manual means.

As generally typically illustrated in FIG. 6, in the preferred embodiment a wall portion 318 is set in, i.e., inwardly of cart wall 184, a distance selected to enable the heads of golf clubs as well as projecting portions of other carried devices to be contained within the space or chamber 317 defined between carrying wall 318 and door 300 when such door 300 becomes closed. In the preferred embodiment, the chamber 317 defined generally between carrying wall 318 and door 300 is provided with a generally peripheral seal 320, which door 300 operatively engages upon being closed, as to prevent the leakage therepast of, for example, water and/or dust.

The set-in or set-back of the support or carrying wall 318 may be established as by a generally peripheral frame 322 comprised as of generally transverse frame portions 324, 326, 328 and 330 so that the space previously referred to effectively continues for the full height (as between 324 and 328) and full width of the chamber 317.

Still referring to FIG. 6, the support or carrying means 318 is depicted as comprising a plurality of apertures or passages formed therethrough. Such apertures or passages are depicted as comprising 332, 334, 336, 338, 340, 342, 344, 346, 348, 350, 352, 354, 356, 358, 360 and 362. For purposes of at least limited illustration, a golf club such as a "driver" or a "1-wood" 364 is shown carried by the carrier means 318 as by having its club shaft generally extending through aperture or passage 334. Somewhat similarly a second golf club 366, which may be a No. 9 iron, is carried by the carrier means 318 as by having club shaft generally extending through aperture or passage 356. Other golf clubs forming an entire set of clubs would be removably carried as by the means 318 and selectively placed into what could be considered corresponding apertures or passages. Additional items such as, for example, an umbrella (not shown) may also be received by a selected aperture or apertures.

FIG. 5 illustrates what may be considered a mirror image of the structure shown and disclosed in FIG. 6. In the main, the reference numbers employed in FIG. 5, relating to the set-in wall and apertures, correspond to the numbers employed in FIG. 6 provided with a suffix, R.

The apertures or passages formed in either of carrier members 318 and 318R, at their interior, communicate with a chamber 399 which may be generally defined: (a) at its top by the inner or under-surface of the rear portion of the roof structure 200; (b) at its bottom by the inner or top surface of a wall-like portion 420 (FIG. 12); (c) at its right side generally by the inner surface of set-in wall or carrier 318R; (d) at its left side generally by the inner surface of set-in wall or carrier 318; (e) at its forward end by the inner or rearward side of transverse wall 118 and (f) at its aft end generally by the inner or forward side of rear wall 190.

FIG. 10 is intended to depict, in a general manner, that in the preferred embodiment, all of the apertures in set-in wall or carrier 318 are operatively connected to tubular members 382, 384, 386, 388, 400, 402 and 404. Likewise, tubular members 406, 408, 410, 412, 414, and 416 are depicted as operatively connected to apertures formed in the carrier wall or means 318R. It may be assumed that the upper ends of tubular members 406, 408, 410, 412, 414 and 416 are respectively connected to apertures 334R, 332R, 338R, 344R, 352R and 358R. FIG. 10 does not attempt to show all of the tubular members because the placements thereof would at least tend to obscure aspects of the invention.

In the preferred embodiment, the tubes 382, 386, 388, 400, 402, 404, 406, 408, 410, 412, 414 and 416 along with the other tubes operatively connected to the apertures of the carriers 318 and 318R are directed downwardly, as typically depicted, by example, in FIG. 12, so that the free ends of the tubes (such by way of example possibly being tubes 382 and 408) preferably rest upon the inner lower surface 420 of the cart 10. The tubes are interspersed with each other in a manner whereby the end result is a bundle of such tubes much interlocked with each other. There is no real need of having the lower ends of the tubes closed and preferably such lower ends, as at 422 and 424, would continue to be open.

Figure 13:
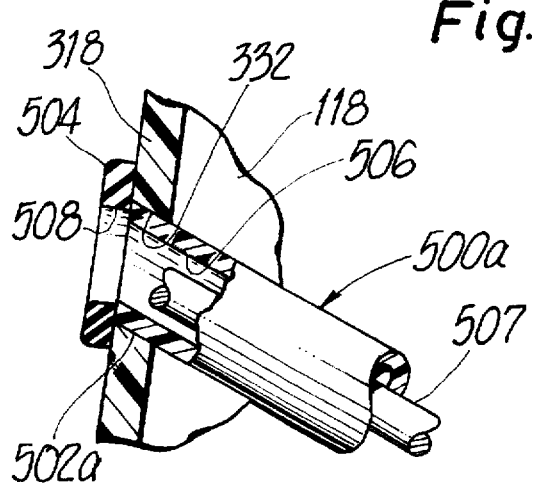
FIG. 13 is a relatively enlarged view, with a fragmentary portion shown broken away and in cross-section, of an embodiment of a tube structure employable in practicing the invention.
Figure 14:
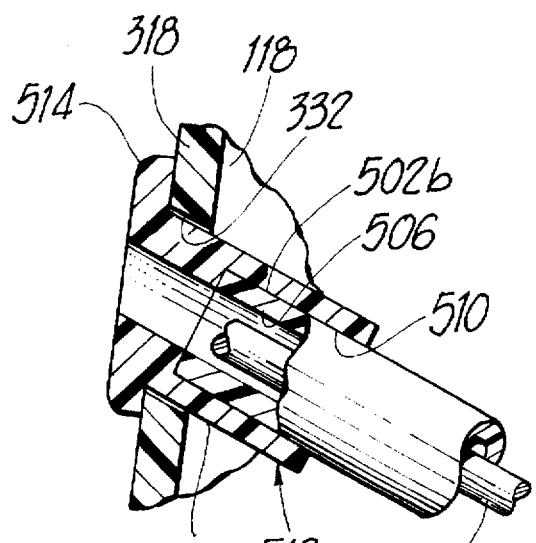
FIG. 14 is a view similar to that of FIG. 13 but illustrating an other embodiment of a tube structure employable in practicing the invention.
Figure 15:
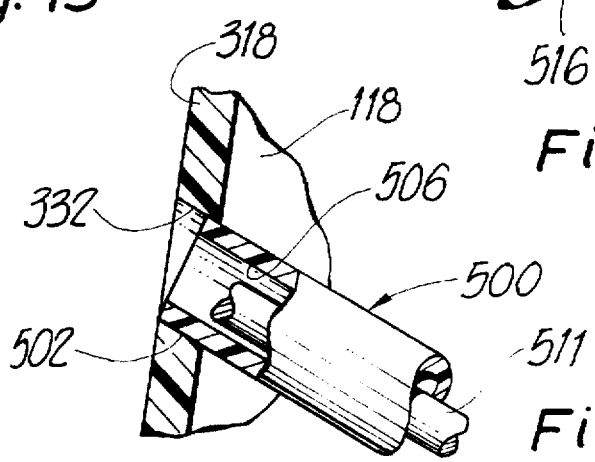
FIG. 15 is a view similar to that of FIG. 14 and illustrating a still further embodiment of a tube structure employable in practicing the invention.

Even though the tubes (as shown in FIGS. 10 and 12) may be of any suitable material and of any suitable configuration, in the preferred embodiment, and employing a fragmentary portion of tube 382 for illustrative purposes FIGS. 13, 14 and 15 depict but some of the contemplated configurations.

FIG. 15 may be considered the simplest operative combination as between a tube 500 and support 318. In this example, the tube 500 is preferably of a dimension or configuration whereby the upper end portion 502 of the exemplary tube 500 is press-fitted into an aperture of wall 318 such as aperture 332 employed herein by way of example.

FIG. 13 fragmentarily illustrates another operative combination as between an exemplary tube 500a and support 318. In the embodiment of FIG. 13, the exemplary tube 500a has its upper end 502a preferably press-fit into aperture 332 which, again, is herein employed by way of example. The embodiment of FIG. 13 also contemplates the suitable attachment, as by an adhesive for example, of an annular generally resilient member 504 generally circumscribing the passage 506 and itself having a passage 508. When a golf club is inserted into passage 506, the fragmentarily depicted club shaft 507 is shown in passage 506 while the club head (as for example 364 FIG. 6) will abut against the resilient member 504 and thereby at least tend to eliminate rattling noise which might otherwise develop as between the head of a golf club and the wall 318 (or 318R if that should be the wall under consideration).

FIG. 14 fragmentarily illustrates another operative combination as between an exemplary tube 500b and support 318. In the embodiment of FIG. 14 the exemplary tube 500b has its upper end 502b preferably press fit into a counterbore 510 of an adapter 512 having a flange 514 which may be suitably secured to wall 318 as by a press fit between 332 and the outer diameter 516 of adapter 512. As with the embodiments of FIGS. 13 and 15, the exemplary embodiment of FIG. 14 may also employ suitable adhesives as, for example, between flange 514 and wall 318, and/or between passage or orifice 332 and the outer surface of tubular extension 516, and/or between cooperating surfaces as 502b and 510. Fragmentary portions of golf club shafts 509 and 511 are also respectively shown in passages 506 of FIGS. 14 and 15.

The invention contemplates additional embodiments and modifications some of which are specifically disclosed in and by FIGS. 16, 17, 18, 19, 20, 21 and 22.

FIGS. 1 and 10 illustrate rear wheel and tire openings 550 and 552, respectively. In the embodiment of FIGS. 1 and 10 the wheel and tire assembly 46 of FIG. 1 may be considered as freely passing through opening 550 formed in body side wall portion 16 while the wheel and tire assembly 44 of FIG. 10 may be considered as freely passing through opening 552 formed in body side wall portion 18.

It is generally known that the operating stability of any wheeled vehicle is related to the width or distance of the stance of the wheels. That is, for example, if the rear wheel assemblies 44 and 46 were to be positioned as to be axially further away from each other, the vehicle, as 10, would become more stable and less prone to tipping as when traversing slopes and such on, for example, golf courses.

Figure 16:
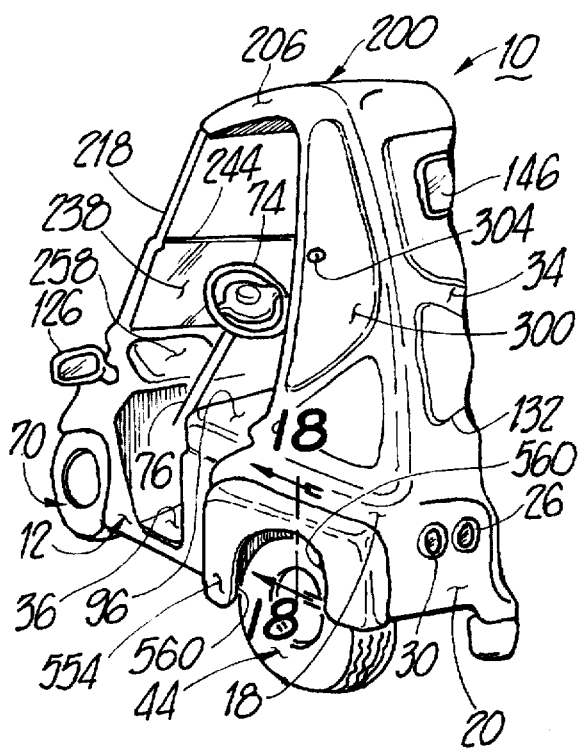
FIG. 16 is a left side elevational view of a portion of the cart 10 illustrating a contemplated modification.
Figure 17:
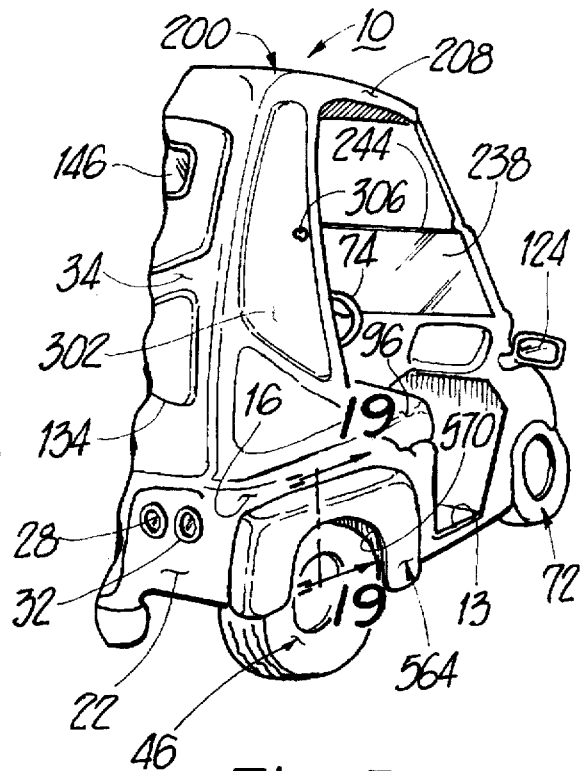
FIG. 17 is a right side elevational view of a portion of the cart 10 illustrating a contemplated modification effectively opposite to that of FIG. 16.

FIGS. 16 and 17 illustrate another embodiment or modification of the invention whereby a left fender 554 is preferably detachably secured, as by a plurality of bolts, lock washers and nuts, two of such being depicted at 556 and 558, to the side wall 18 of the cart 10. As further depicted in FIGS. 16 and 18 the preferred fender 554 is generally arcuate having an opening 560 which preferably freely passes the wheel and tire assembly 44 therethrough. Further, preferably, the fender 554 has an inner flange 562 through which the securing bolt-fasteners, as 556 and 558 pass in securing the fender to the cart side wall 18.

Figure 18:
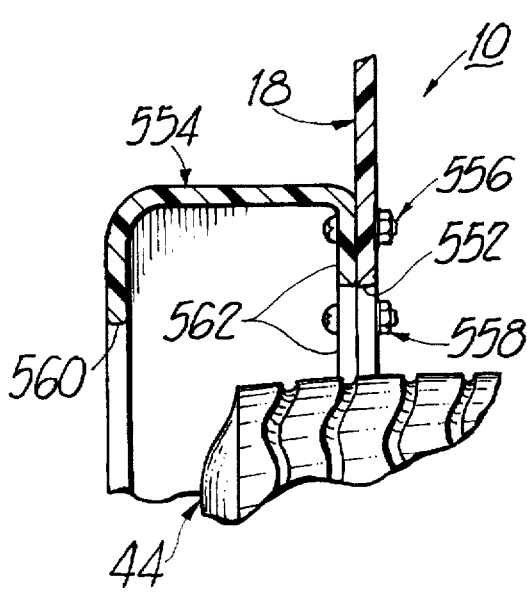
FIG. 18 is a relatively enlarged portion of the structure of FIG. 16 taken generally on the plane of line 18—18 of FIG. 16 and looking in the direction of the arrows.
Figure 19:
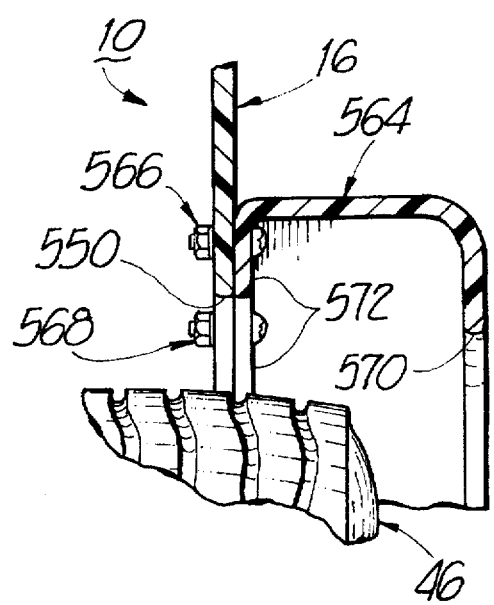
FIG. 19 is a relatively enlarged portion of the structure of FIG. 17 taken generally on the plane of line 19—19 and looking in the direction of the arrows.

Similarly, FIGS. 17 and 19 depict what may be considered a mirror image of the structure of FIGS. 16 and 18. More particularly, a right fender 564 is preferably detachably secured, as by a plurality of bolts, lock washers and nuts, two of such being depicted at 566 and 568, to the side wall 16 of the cart 10. As further depicted in FIGS. 17 and 19 the preferred fender 564 is generally arcuate having an opening 570 which preferably freely passes the wheel and tire assembly 46 therethrough. Further, preferably, the fender 564 has an inner flange 572 through which the securing bolt-fasteners, 566 and 568 pass in securing the fender 564 to the cart side wall 16.

As should be apparent, the wheel and tire assemblies 44 and 46 of FIGS. 16, 17, 18 and 19 are comparatively further spaced from each other thereby enhancing the stability of the modified cart 10.

Although there are various ways in which such rear drive wheel and tire assemblies 44 and 46 can be axially further spaced apart as generally depicted in FIGS. 16, 17, 18 and 19, the invention contemplates a preferred arrangement and method which provides even additional benefits.

It is not unusual that as golf carts are manufactured they are shipped in quantities, as by highway truck, to various locations for distribution and/or sale of such golf carts.

Unfortunately, the width of golf carts, modified as depicted in FIGS. 16 and 18 and FIGS. 17 and 19 are of overall transverse dimensions which prevent them from being placed immediately adjacent to each other in a side-by-side relationship upon the highway truck because the overall (side-by-side) dimension exceeds permissible load width.

The invention contemplates apparatus and method whereby such golf carts as generically depicted in FIGS. 16, 18 and FIGS. 17, 19 can be placed immediately adjacent to each other, in a side-by-side relationship upon a highway truck without resulting in an excessively wide load.

The invention contemplates the accomplishment of the above, generally by the following.

FIG. 20 depicts a fragmentary portion of the chassis assembly 38 of FIG. 11. For ease of presentation it may be assumed that the remaining portion of the chassis assembly 38 which is not shown in FIG. 20, and except as noted to the contrary, may be that as shown and disclosed in FIG. 11.

What is contemplated and shown in FIG. 20 is that the axle hub 574 which normally would be a part of the chassis 38 as depicted in FIG. 11, and which has, for example, a plurality of lug bolts 576, 578, 580 and 582 would under normal or usual conditions be directly connected to wheel assembly 46 and secured thereto with the usual wheel lug nuts. (This is considered to be typical in that the left rear wheel assembly 44 and the left axle hub would be the mirror image of that just described.) Securing such lug bolts or studs to the wheel assembly 46 would result in the rather relatively narrow track of FIG. 11 wheel assemblies 44 and 46.

Consequently, the resulting narrower track golf cart 10, as depicted for example in FIG. 10, could be placed in side-to-side relationship with a companion golf cart, onto a highway common carrier truck, without creating a too-wide of load on such truck.

It is contemplated that in such instances as when a customer desires and orders the wider rear wheel track, as hereinbefore discussed depicted as by FIGS. 16, 18 and FIGS. 17, 19, that a kit would be provided which kit would initially be separate from and not installed onto what may be considered the relatively narrow rear wheel track of FIGS. 1-10. That is, such a kit would preferably comprise a set or pair of fenders as 554 and 564 along with fasteners such as 556, 558, 566 and 568 and further comprising what may be considered as spacers with only one being shown at 584 although at least two of such spacers 584 would be employed; i.e., one for the right wheel assembly 46 and one for the left wheel assembly 44.

More particularly and as typically illustrated in FIG. 20, each of the spacers 584 would preferably comprise a body 586 of preselected operative axial length with such body 586 carrying lug bolts or studs 588, 590, 592 and 594 in a regular pattern as to match cooperating stud or bolt holes 596, 598, 600 and 602 formed through the wheel portion 47 of the wheel and tire assembly.

Further, each of the spacers 584 has a plurality of passages for the acceptance of the studs 576, 578, 580 and 582 with, preferably such passages being formed with respective counterbores 604, 606, 608 and 610 whereby lug nuts may be inserted, engaged with respective studs 576, 578, 580 and 582 in order to fixedly connect the spacer 584 to the axle hub 574. After the studs 588, 590, 592 and 594 are passed through 602, 596, 598 and 600 and cooperating threaded nuts are engaged therewith, the wheel and tire assembly 46 assumes a position as generally depicted in FIGS. 17 and 19.

As previously stated the foregoing description relating to FIG. 20 and the wider positioning of wheel and tire assembly 46 was to be considered as typical in that the left-side rear wheel and tire assembly 44 would be wider positioned in the same but mirror image manner thereby assuming a position as heretofore discussed and depicted in FIGS. 16 and 18.

The invention also contemplates the employment of multiple wheel and tire assemblies at each end of the axle assembly. An embodiment of such a modification is depicted in FIGS. 21 and 22.

Referring first to FIG. 21, typically, a hub 630 secured to and carried by and at an end of the axle shaft 40 in turn carries a spacer 632, which may be considered functionally equivalent to spacer 584, which is fixedly secured as by bolts or studs 634, 636, 638 and 640.

A first wheel and tire assembly 642 is shown having the center portion of the wheel 644 against the face of the spacer 632. A second wheel and tire assembly 646 is shown having a wheel 648 which is sufficiently dished or concave as to have the central portion 650 of the wheel 648 against a face of the central portion of adjacent wheel 644. As depicted in both FIGS. 21 and 22 the two wheel and tire assemblies 642 and 646 may be operatively fixedly secured to the golf cart axle shaft 40 by a plurality of bolts or studs 652, 654, 656 and 658 which are shown as threaded into the spacer 632. It should, of course, now be apparent that depending upon the width of the rear wheel track desired, the spacer 632 could be not used and the wheel and tire assemblies 642 and 646, keeping their depicted relative positions, brought operatively against the hub 630 and fixedly secured thereto in the manner that they are now depicted as secured to the spacer 632.

Although only a preferred embodiment and a limited number of modifications of the invention have been disclosed and described it is apparent that other embodiments and modifications of the invention are possible within the scope of the appended claims.

What is claimed is:

1. A self-propelled golf cart, comprising a golf cart body, wherein said cart body comprises a forward disposed cart body portion, wherein said cart body comprises a rearward disposed cart body portion, wherein said cart body comprises a generally medially situated portion effective for accommodating and carrying thereon at least two players of golf, a chamber formed in said rearward disposed cart body portion, wherein said chamber comprises first and second side walls spaced from each other and generally opposed to each other, a first plurality of apertures formed through said first side wall, a second plurality of apertures formed through said second side wall, first axially extending passages situated generally in said chamber, wherein said first axially extending passages comprise first ends and second ends, wherein said first ends are respectively operatively connected to said first plurality of apertures, wherein said first ends are at an elevation higher than the elevation of said second ends, second axially extending passages situated generally in said chamber, wherein said second axially extending passages comprise third ends and fourth ends, wherein said third ends are respectively operatively connected to said second plurality of apertures, wherein said third ends are at an elevation higher than the elevation of said fourth ends, and wherein respective ones of said first and second axially extending passages carry and support respective golf clubs by having the shafts of said respective golf clubs received through said first and second apertures and received in said axially extending passages operatively connected to such first and second apertures.

2. A self-propelled golf cart according to claim 1 wherein said second ends of said first axially extending passages are open.

3. A self-propelled golf cart according to claim 1 wherein said fourth ends of said second axially extending passages are open.

4. A self-propelled golf cart according to claim 1 and further comprising first and second openable and closable side doors, said first door being operatively connected to said first side wall at a side thereof opposite to said chamber, said second door being operatively connected to said second side wall at a side thereof opposite to said chamber, said first door when opened providing access to the heads of such golf clubs as are carried by said first axially extending passages, and said second door when opened providing access to the heads of such golf clubs as are carried by said second axially extending passages.

5. A self-propelled golf cart according to claim 4 wherein when said first door is closed the heads of such golf clubs as are carried by said first axially extending passages are contained between said first side wall and said closed first door, and wherein when said second door is closed the heads of such golf clubs as are carried by said second axially extending passages are contained between said second side wall and said second closed door.

6. A self-propelled golf cart according to claim 1 wherein said first ends of said first axially extending passages are at an elevation above the elevation of said fourth ends, and wherein said third ends of said second axially extending passages are at an elevation above the elevation of said second ends.

7. A self-propelled golf cart according to claim 1 wherein said first axially extending passages comprise a first plurality of separate tubular members each having a said first and said second end, wherein said second axially extending passages comprise a second plurality of separate tubular members each having a said third and said fourth end, and wherein at least some of said first plurality of separate tubular members and at least some of said second plurality of separate tubular members are interspaced with each other.

8. A self-propelled golf cart according to claim 1 and further comprising an openable and closable first side door operatively carried by said first side wall, an openable and closable second side door operatively carried by said second side wall, said first side door when opened providing access to said first side wall and through said first side wall to said chamber, and said second side door when opened providing access to said second side wall and through said second side wall to said chamber.

9. A self-propelled golf cart according to claim 1 wherein said chamber is further comprised of a relatively forwardly situated generally vertically extending wall generally separating said chamber from said medially situated portion, wherein said chamber is further comprised of a relatively rearwardly situated generally vertically extending wall, wherein said chamber extends generally from said first side wall to said second side wall, and wherein said chamber extends generally from said forwardly situated wall to said relatively rearwardly situated wall.

10. A self-propelled golf cart according to claim 9 and further comprising a rear door pivotally supported by said rearwardly situated wall and pivotally openable and closable with respect to said rearwardly situated wall, a relatively small stowage compartment formed generally between said rearwardly situated wall and said chamber, and wherein when said rear door is opened access is provided to said stowage compartment.

11. A self-propelled golf cart according to claim 9 and further comprising first, second and third rear doors each pivotally supported by said rearwardly situated wall and each pivotally openable and closable with respect to said rearwardly situated wall, a relatively small first stowage compartment formed generally between said rearwardly situated wall and said chamber, wherein when said first rear door is opened access is provided to said first stowage compartment, a relatively small second stowage compartment formed generally between said rearwardly situated wall and said chamber, wherein when said second door is opened access is provided to said second stowage compartment, a relatively small third stowage compartment formed generally between said rearwardly situated wall and said chamber, and wherein when said third door is opened access is provided to said third stowage compartment.

12. A self-propelled golf cart according to claim 1 and further comprising a plurality of ground engaging cart wheel and tire assemblies, a drive axle assembly having first and second operative ends, and wherein first and second wheel and tire assemblies of said plurality of ground engaging wheel and tire assemblies are respectively operatively connected to said first and second operative ends.

13. A self-propelled golf cart according to claim 12 and further comprising first and second axle extenders, said first axle extender being effective to be operatively secured to said first operative end of said drive axle assembly, said second axle extender being effective to be operatively secured to said second operative end of said drive axle assembly, wherein said first wheel and tire assembly is operatively connected to said first operative end of said drive axle assembly by being operatively connected to said first axle extender, and wherein said second wheel and tire assembly is operatively connected to said second operative end of said drive axle assembly by being operatively connected to said second axle extender.

14. A self-propelled golf cart according to claim 13 and further comprising first and second fender structures, wherein said first fender is operatively carried by said first side wall as to be in a spaced relationship with and at least partly cover said first wheel and tire assembly, and wherein said second fender is operatively carried by said second side wall as to be in spaced relationship with and at least partly cover said second wheel and tire assembly.

15. A self-propelled golf cart according to claim 1 and further comprising a plurality of ground engaging cart wheel and tire assemblies, a drive axle assembly having first and second oppositely disposed operative ends, wherein said plurality of ground engaging cart wheel and tire assemblies comprises a first set of wheel and tire assemblies having first and second wheel and tire assemblies in side-by-side relationship to each other and operatively connected to said first operative end of said drive axle assembly, and wherein said plurality of ground engaging cart wheel and tire assemblies further comprises a second set of wheel and tire assemblies having third and fourth wheel and tire assemblies in side-by-side relationship to each other and operatively connected to said second operative end of said drive axle.

16. A self-propelled golf cart according to claim 15 and further comprising first and second axle extenders, said first axle extender being effective to be operatively secured to said first operative end of said drive axle assembly, said second axle extender being effective to be operatively secured to said second operative end of said drive axle assembly, wherein said first and second wheel and tire assemblies are operatively connected to said first operative end of said drive axle assembly by being operatively connected to said first axle extender, and wherein said third and fourth wheel and tire assemblies are operatively connected to said second operative end of said drive axle assembly by being operatively connected to said second axle extender.

17. A self-propelled golf cart according to claim 15 and further comprising first and second fender structures, wherein said first fender is operatively carried by said first side wall as to be in a spaced relationship with and at least partly cover said first set of wheel and tire assemblies, and wherein said second fender is operatively carried by said second side wall as to be in spaced relationship with and at least partly cover said second set of wheel and tire assemblies.

18. A self-propelled golf cart according to claim 1 wherein said chamber is further comprised of a forwardly situated generally vertically extending wall generally separating said chamber from said medially situated portion, wherein said chamber is further comprised of a rearwardly situated generally vertically extending wall, wherein said chamber extends generally from said first side wall to said second side wall, wherein said chamber extends generally from said forwardly situated wall to said rearwardly situated wall, and a shelf structure operatively joining said forwardly situated generally vertically extending wall to said rearwardly situated generally vertically extending wall, said shelf structure providing shelf space for the carrying thereon of selected goods.

19. A self-propelled golf cart according to claim 1 wherein said shelf structure comprises a shelf surface which when viewed as from a location in said medially situated portion appears to be the lowest in elevation at a mid-portion thereof and relatively raised in elevation at portions of said shelf surface extending away from said mid-portion.

20. A self-propelled golf cart according to claim 1 and further comprising a plurality of ground engaging cart wheel and tire assemblies, a drive axle assembly having first and second operative ends, wherein said plurality of ground engaging wheel and tire assemblies comprise first and second wheel and tire assemblies respectively operatively connected to said first and second operative ends, first and second axle extenders, said first axle extender being effective to be operatively secured to said first operative end of said drive axle assembly, said second axle extender being effective to be operatively secured to said second operative end of said drive axle assembly, wherein said first wheel and tire assembly is operatively connected to said first operative end of said drive axle assembly by being operatively connected to said first axle extender, and wherein said second wheel and tire assembly is operatively connected to said second operative end of said drive axle assembly by being operatively connected to said second axle extender.

21. A self-propelled golf cart according to claim 20 and further comprising first and second fender structures, wherein said first fender is operatively carried by said first side wall as to be in a spaced relationship with and at least partly cover said first wheel and tire assembly, and wherein said second fender is operatively carried by said second side wall as to be in spaced relationship with and at least partly cover said second wheel and tire assembly.

22. A self=propelled golf cart according to claim 1 and further comprising a generally vertically extending third wall rearwardly of said medially situated portion and joined to said first side wall and to said second side wall, as to generally traverse the distance between said first side wall and said second side wall, and an opening formed in said vertically extending third wall enabling the area rearwardly of said golf cart to be viewed from locations within said generally medially situated portion.

23. A self-propelled golf cart according to claim 22 and further comprising a window member generally covering said opening.

24. A self-propelled golf cart according to claim 23 and further comprising pivot means operatively joining said window member to said generally vertically extending third wall, said pivot means enabling said window member to be pivotally rotated thereabout thereby providing for air flow through said opening.

25. A self-propelled golf cart, comprising a golf cart body, wherein said cart body comprises a forward disposed cart body portion, wherein said cart body comprises a rearward disposed cart body portion, wherein said cart body comprises a generally medially situated portion effective for accommodating and carrying thereon at least two players of golf, wherein said medially situated portion comprises seat means for enabling said at least two players to be seatingly supported thereby, wherein said cart body further comprises first and second side walls spaced from each other and generally opposed to each other, wherein said first and second side walls are carried by said rearward cart body portion and extend upwardly, a generally laterally extending roof portion supported by said first and second side walls and having a generally forward disposed roof portion, first and second generally vertically extending supports laterally spaced from each other and respectively having first and second lower end portions and respectively having first and second upper end portions, wherein said first and second upper end portions are operatively connected to said forward disposed roof portion as to thereby have said laterally extending roof portion extending generally laterally above at least a substantial portion of said generally medially situated portion, a windshield structure having a generally lower functional end and an upper functional end, wherein said lower functional end of said windshield structure is at an elevation generally that of said first and second lower end portions of said first and second generally vertically extending laterally spaced supports, wherein said upper functional end is at least closely situated to said forward disposed roof portion, wherein said first and second generally laterally spaced vertically extending supports are positioned as to be inclined with respect to each other as to be more closely spaced from each other as said first and second generally laterally spaced vertically extending supports increase in distance upwardly from said cart body, further comprising a plurality of ground engaging cart wheel and tire assemblies, a drive axle assembly having first and second operative ends, and wherein first and second wheel and tire assemblies of said plurality of ground engaging wheel and tire assemblies are respectively operatively connected to said first and second operative ends.

26. A self-propelled golf cart according to claim 25 and further comprising first and second axle extenders, said first axle extender being effective to be operatively secured to said first operative end of said drive axle assembly, said second axle extender being effective to be operatively secured to said second operative end of said drive axle assembly, wherein said first wheel and tire assembly is operatively connected to said first operative end of said drive axle assembly by being operatively connected to said first axle extender, and wherein said second wheel and tire assembly is operatively connected to said second operative end of said drive axle assembly by being operatively connected to said second axle extender.

27. A self-propelled golf cart according to claim 26 and further comprising first and second fender structures, wherein said first fender is operatively carried by said first side wall as to be in a spaced relationship with and at least partly cover said first wheel and tire assembly, and wherein said second fender is operatively carried by said second side wall as to be in spaced relationship with and at least partly cover said second wheel and tire assembly.

* * * * *

UNITED STATES PATENT AND TRADEMARK OFFICE
CERTIFICATE OF CORRECTION

PATENT NO. : 5,718,301

DATED : February 17, 1998

INVENTOR(S) : Hansford R. Williams

It is certified that error appears in the above-identified patent and that said Letters Patent is hereby corrected as shown below:

Column 14, line 1 (Claim 19, line 1 thereof), delete "claim 1" and substitute therefor, --- claim 18 ---.

Column 15, line 19 (Claim 25, line 36 thereof), between "body," and "further comprising" insert --- and ---.

Signed and Sealed this

Seventh Day of July, 1998

*Attest:*

BRUCE LEHMAN

*Attesting Officer*    Commissioner of Patents and Trademarks